United States Patent
Wu et al.

(10) Patent No.: US 12,408,679 B2
(45) Date of Patent: Sep. 9, 2025

(54) FRUIT STERILIZING AND COOLING DEVICE USING PLASMA-ACTIVATED ICE-WATER MIXTURE

(71) Applicant: ZHEJIANG UNIVERSITY, Hangzhou (CN)

(72) Inventors: Di Wu, Hangzhou (CN); Feng Jiang, Hangzhou (CN); Xiangzheng Yang, Hangzhou (CN); Chongde Sun, Hangzhou (CN); Kunsong Chen, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 0 days.

(21) Appl. No.: 18/991,794

(22) Filed: Dec. 23, 2024

(65) Prior Publication Data
US 2025/0120411 A1    Apr. 17, 2025

Related U.S. Application Data

(63) Continuation of application No. PCT/CN2024/073395, filed on Jan. 22, 2024.

(30) Foreign Application Priority Data

Feb. 24, 2023    (CN) .......................... 202310162638.4

(51) Int. Cl.
*A23B 7/04*      (2006.01)
*A23B 7/055*     (2006.01)
(Continued)

(52) U.S. Cl.
CPC ............ *A23B 7/0425* (2013.01); *A23B 7/055* (2013.01)

(58) Field of Classification Search
None
See application file for complete search history.

(56) References Cited

U.S. PATENT DOCUMENTS

2008/0087037 A1* 4/2008 Rapaz .................. F25D 3/08
                                                    62/457.2

FOREIGN PATENT DOCUMENTS

CN          104957241 A      10/2015
CN          108497519 A  *   9/2018    ............. A23B 7/154
(Continued)

OTHER PUBLICATIONS

Document titled Plasma processing device and method for prolonging fruit and vegetable fresh-keeping period, English machine translation of CN 115039807 A provided by Clarivate, original document published Sep. 13, 2022 (Year: 2022).*

(Continued)

*Primary Examiner* — Holly Kipouros
(74) *Attorney, Agent, or Firm* — Bayramoglu Law Offices LLC

(57) ABSTRACT

A fruit sterilizing and cooling device using a plasma-activated ice-water mixture includes a top-opened tank body, where the tank body includes a front side provided with an ice-water tank, and a rear side provided with a cooling tank; a clapboard is provided between the ice-water tank and the cooling tank; a water passing port is formed in an upper portion of the clapboard; a grid plate is inserted at the water passing port; ice cubes are added to an upper portion of the ice-water tank; one side of a lower portion of the ice-water tank is connected to a plasma-activated water (PAW) generator; a valve is provided at a water outlet of the PAW generator; a fixed fence frame and a movable fence frame are provided in the cooling tank; and fruits to be treated are placed in the movable fence frame.

20 Claims, 7 Drawing Sheets

(51) Int. Cl.
*A61L 2/14* (2006.01)
*A61L 2/18* (2006.01)

(56) References Cited

FOREIGN PATENT DOCUMENTS

| | | | |
|---|---|---|---|
| CN | 108719451 A | | 11/2018 |
| CN | 111280466 A | | 6/2020 |
| CN | 111296557 A | | 6/2020 |
| CN | 212291215 U | | 1/2021 |
| CN | 112586555 A | | 4/2021 |
| CN | 213604230 U | | 7/2021 |
| CN | 213785148 U | | 7/2021 |
| CN | 115039807 A | * | 9/2022 |
| CN | 116369371 A | | 7/2023 |
| FR | 2560977 A1 | | 9/1985 |

OTHER PUBLICATIONS

Document titled Integrated device useful in cleaning . . . , English machine translation of CN 108497519 A provided by Clarivate, original document published Sep. 7, 2018 (Year: 2018).*

* cited by examiner

FRUIT STERILIZING AND COOLING DEVICE USING PLASMA-ACTIVATED ICE-WATER MIXTURE

CROSS-REFERENCE TO THE RELATED APPLICATIONS

This application is a continuation application of International Application No. PCT/CN2024/073395, filed on Jan. 22, 2024, which is based upon and claims priority to Chinese Patent Application No. 202310162638.4, filed on Feb. 24, 2023, the entire contents of which are incorporated herein by reference.

TECHNICAL FIELD

The present disclosure belongs to the field of fruit post-harvest treatment, relates to a sterilizing and cooling device for fruits from picking to storage, and particularly relates to a fruit sterilizing and cooling device using a plasma-activated ice-water mixture.

BACKGROUND

With the development of industry, for the sake of higher economic value of fruits, and a higher income level of fruit growers, fruits do not come into the market directly after being picked, but gradually tend to undergo a series of treatment processes including picking, sorting, cleaning, sterilization, and storage.

Most fruits are harvested at relatively high temperatures, and usually contain a large amount of field heat. This makes the picked fruits suffer a water loss for the continuous physiological process, and accelerates the metabolism of the fruits and the growth of microorganisms, thus lowering the quality of the fruits and increasing the post-harvest rot. Hence, the picked fruits are usually stored at a low temperature to prevent the quality change of the fruits in storage. In the low-temperature storage, the surfaces of the fruits can be cooled quickly, but the cores of the fruits have a relatively high temperature to maintain the continuous physiological process. In view of heat produced in the continuous physiological process, the cores are cooled slowly and can keep the relatively high temperature for a long time, thereby affecting the quality of the fruits in the low-temperature storage. For example, grapes not precooled sufficiently will maintain a certain respiratory intensity to increase the consumption of organic matters. In high-temperature and high-humidity environments, the quality loss of the pomegranates due to a respiratory action is increased by 12%. The Yali pears suffer the core browning if not cooled uniformly. In high-temperature transportation, the plums are softened with a loss of volatile substances. If the harvested cherries are not precooled timely, the activity of endogenous oxidase in the fruits is enhanced to accelerate oxidation and aging of the fruits.

Fruits that can undergo water immersion treatment such as the cherries can be precooled with a spray before the low-temperature storage. For example, the Chinese Patent (CN213785148U) provides an immersion spray-type precooler, which can realize spray cooling on the fruits such as cherries, nectarines, and apricots. However, the existing spray cooling on the cherries is defective for large water consumption, long time consumption, and low efficiency. Moreover, if a bactericide is directly added to the spray water, a large amount of sewage is produced to greatly increase the treatment cost and the pollution risk. Therefore, sterilization is additionally to be carried out.

SUMMARY

An objective of the present disclosure is to provide a fruit sterilizing and cooling device using a plasma-activated ice-water mixture, to solve the problems of large water consumption, long time consumption, and additional sterilization of the spray cooling on the fruits that can undergo water immersion treatment such as the cherries. The present disclosure makes use of the plasma-activated ice-water mixture to sterilize and cool the fruits such as the cherries at the same time, and solves the cooling problem for the over-high initial temperature of the plasma-activated water (PAW), and the problem that the temperature of the water for soaking the fruits rises easily.

The technical solutions adopted by the present disclosure to solve the technical problems are as follows: A fruit sterilizing and cooling device using a plasma-activated ice-water mixture includes a top-opened tank body, where the tank body includes a front side provided with an ice-water tank, and a rear side provided with a cooling tank; a clapboard is provided between the ice-water tank and the cooling tank; a water passing port is formed in an upper portion of the clapboard; a grid plate is inserted at the water passing port; ice cubes are added to an upper portion of the ice-water tank; one side of a lower portion of the ice-water tank is connected to a PAW generator; a valve is provided at a water outlet of the PAW generator; a fixed fence frame and a movable fence frame are provided in the cooling tank; fruits to be treated are placed in the movable fence frame; both the fixed fence frame and the movable fence frame are a grid frame; a grid bar at a bottom of the fixed fence frame and a grid bar at a bottom of the movable fence frame are provided alternately in a staggered manner; the bottom of the fixed fence frame and the bottom of the movable fence frame are wave-shaped; a peak at the bottom of the fixed fence frame and a valley at the bottom of the movable fence frame are aligned up and down; a valley at the bottom of the fixed fence frame and a peak at the bottom of the movable fence frame are aligned up and down; the movable fence frame is provided with lifting handles higher than the tank body; a rear side of the cooling tank is provided with an overflow port; and a rear side of the overflow port is provided with an overflow tank.

The device is used to sterilize and cool the picked fruits that can undergo water immersion treatment such as cherries. The low-temperature storage is considered as an important method to prolong a shelf life of the fruits. Before the fruits are sent to a cold store for the low-temperature storage, the shelf life of the fruits can be effectively prolonged by sterilization. According to research findings, the surfaces of the fruits in the cold store can be cooled quickly to a low temperature, but the cores of the fruits can keep a relatively high temperature for a long time to affect the quality of the fruits. The device makes use of the plasma-activated ice-water mixture to sterilize and cool the fruits. As a green and economic sterilization technology, the plasma is advantageous for high sterilization efficiency, environmental protection, desirable energy conservation, simple operation, etc. It is revealed by recent research that active components in the low-temperature plasma can react with water to generate PAW. The PAW can effectively kill microbial cells, including *Escherichia coli, Staphylococcus aureus, Staphylococcus epidermidis, Leuconostoc mesenteroides*, and *Saccharomyces cerevisiae*. Reactive oxygen as a main sterilizing component in the plasma is generated by a physical action of high-pressure ionization. Due to the unstable property, the reactive oxygen is decomposed naturally after placed a long time, thereby preventing the chemical pollution. The PAW can be prepared by discharging water with a high-voltage circuit. The prepared PAW has a temperature of about 50° C., and is to be cooled uniformly for use. The high-temperature PAW cannot come in direct contact with the fruits. The fruits cannot be immersed into the initial PAW before the water temperature is stable. In order to keep the sterilization effect of the water for a long time, it is necessary to add newly prepared PAW intermittently, and ensure that the newly added PAW can also be cooled uniformly. Because of strong oxidation of the PAW, the fruits in the water cannot be turned over manually in treatment. Due to the heat released in cooling on the cores of the fruits, the heated water must be cooled continuously in the soaking process. According to the device, the tank body is separated into two portions. The ice-water tank at the front side of the tank body is configured to fill the ice cubes to cool the PAW. The cooling tank at the rear side of the tank body is configured to immerse the fruits to cool and sterilize the fruits. The clapboard is provided between the ice-water tank and the cooling tank. The width of the grid of the grid plate is less than the initial particle size of the ice cube. Since the initial ice cube has many corner angles to scratch the fruits, the large ice cube is stopped by the grid plate. When the surface of the ice cube melts until the particle size of the ice cube is less than the width of the grid, the ice cube can pass through the grid plate with the water. Consequently, half-melted ice cubes with round and smooth surfaces are floated on the cooling tank, and the cooling tank keeps the ice-water mixed state to continuously cool the fruits. The overflow tank can be configured to recycle overflowing water when the PAW and the ice cube are added. The overflowing water can reenter the PAW generator, and can also be used for making the ice cube by virtue of the low temperature to reduce the ice-making energy consumption. During the sterilization and cooling of the fruits, the movable fence frame can be lifted up and down, such that the fruits are turned over between the peak and the valley of the movable fence frame, and between the peak and the valley of the fixed fence frame to achieve the uniform sterilization and treatment effect. Under an action of a buoyancy force of the water, the fruits are turned over gently, without the mechanical damage. Meanwhile, the half-melted ice cubes with the round and smooth surfaces in the cooling tank do not scratch the fruits, either. The device can be used in laboratories, and can also be amplified based on the same principle for industrial use.

Preferably, the bottom of the fixed fence frame and the bottom of the movable fence frame are identically wave-shaped; and when the valley of the movable fence frame comes in contact with a bottom of the cooling tank, the peak of the movable fence frame is flush with the valley of the fixed fence frame. When the movable fence frame is lowered to a bottommost portion, the fruits can be turned over to the fixed fence frame from the movable fence frame.

Preferably, lugs are respectively provided at a front end and a rear end of the fixed fence frame; and cross-bars for supporting the lugs are respectively provided above the water passing port and the overflow port.

Preferably, the lifting handles are respectively provided at a front end and a rear end of the movable fence frame, or at a left side and a right side of the movable fence frame.

Preferably, a cover plate is provided on the tank body; and an avoidance groove for allowing the lifting handle of the movable fence frame to pass through is formed in the cover plate. The cover plate can isolate the PAW to reduce influences on the environment. Lifting the movable fence frame up and down can turn over the fruits. The size of the avoidance groove can be very small.

Preferably, the grid plate is provided with multiple groups of grids from top to bottom; and the multiple groups of grids are gradually narrow. By adjusting the grid plate up and down, grids of different widths can be used to adapt to different initial sizes of the ice cubes and different sizes of the fruits.

Preferably, a width of the grid is not greater than an initial particle size of the ice cube.

Preferably, the overflow port is provided with an adjustment weir plate; and the adjustment weir plate is clasped at a lower edge of the overflow port in a height adjustable manner. The adjustment weir plate is configured to control a water level of the cooling tank, so as to adapt to a stacked height of the fruits.

As another preferable solution, a water outlet is formed in a sidewall of a rear end of the cooling tank; the water outlet is connected to the ice-water tank through a circulating pump; a three-way valve is provided between the circulating pump and the ice-water tank; the three-way valve includes two inlets and one outlet; and a second inlet of the three-way valve is connected to the water outlet of the PAW generator. For the three-way valve, the way to the circulating pump and the way to the ice-water tank are normally open. The second inlet to the PAW generator can be opened and closed according to a water inflow. The circulating pump can make the water in the tank body flow, thereby driving more half-melted ice cubes to enter from the ice-water tank to the cooling tank. When the high-temperature PAW is added, the circulating water can be quickly mixed with the newly added PAW. Meanwhile, a proportion of the circulating water to the newly added PAW is controlled at 3:1 to 5:1, to cool the PAW to about 10° C. or lower. The ice cubes in the ice-water tank ensure the uniform low-temperature water in the tank body, and prevent the high-temperature PAW not cooled uniformly from directly flowing to the cooling tank.

As another preferable solution, a water outlet is formed in a sidewall of a rear end of the cooling tank; the water outlet is connected to a circulating water tank through a circulating pump; a water outlet of the circulating water tank is connected to the ice-water tank; the water outlet of the PAW generator is connected to the circulating water tank; and a water level of the circulating water tank is higher than the ice-water tank. The function of the circulating water tank is similar to that of the three-way valve. The circulating water tank is used to mix the circulating water flow with the newly added high-temperature PAW for quick cooling.

The present disclosure has the following beneficial effects: 1. The present disclosure makes use of the plasma-activated ice-water mixture to sterilize the surfaces of the fruits and cool the cores of the fruits that can undergo water immersion treatment such as the cherries at the same time. 2. The present disclosure allows the screened ice cubes of the ice-water mixture to pass through, thereby keeping the cooling water in an ice-water mixed state, and preventing corner angles of the ice cubes from scratching the fruits. 3. With the wave-shaped bottom of the movable fence frame and the wave-shaped bottom of the fixed fence frame, the fruits can be turned over by lifting the movable fence frame up and down. While isolating the PAW, the present disclosure is convenient to turn over the fruits. 4. The present disclosure quickly cools the newly added high-temperature PAW with self-circulation of the cooling water, thereby reducing influences on the low-temperature water in the tank body, and guaranteeing the stable sterilizing and cooling environment in the tank body.

BRIEF DESCRIPTION OF THE DRAWINGS

The present disclosure is further described below with reference to the accompanying drawings.

1: PAW generator, 2: valve, 3: ice-water tank, 4: cooling tank, 5: clapboard, 6: water passing port, 7: initial ice cube, 8: half-melted ice cube, 9: grid plate, 10: fixed fence frame, 11: movable fence frame, 12: overflow port, 13: adjustment weir plate, 14: overflow tank, 15: cross-bar, 16: grid, 17: cherry, 18: reinforcing bar, 19: lifting handle, 20: cover plate, 21: water outlet, 22: circulating pump, 23: three-way valve, and 24: circulating water tank.

DETAILED DESCRIPTION OF THE EMBODIMENTS

The present disclosure will be further described below with reference to the specific embodiments and drawings.

Figure 1:
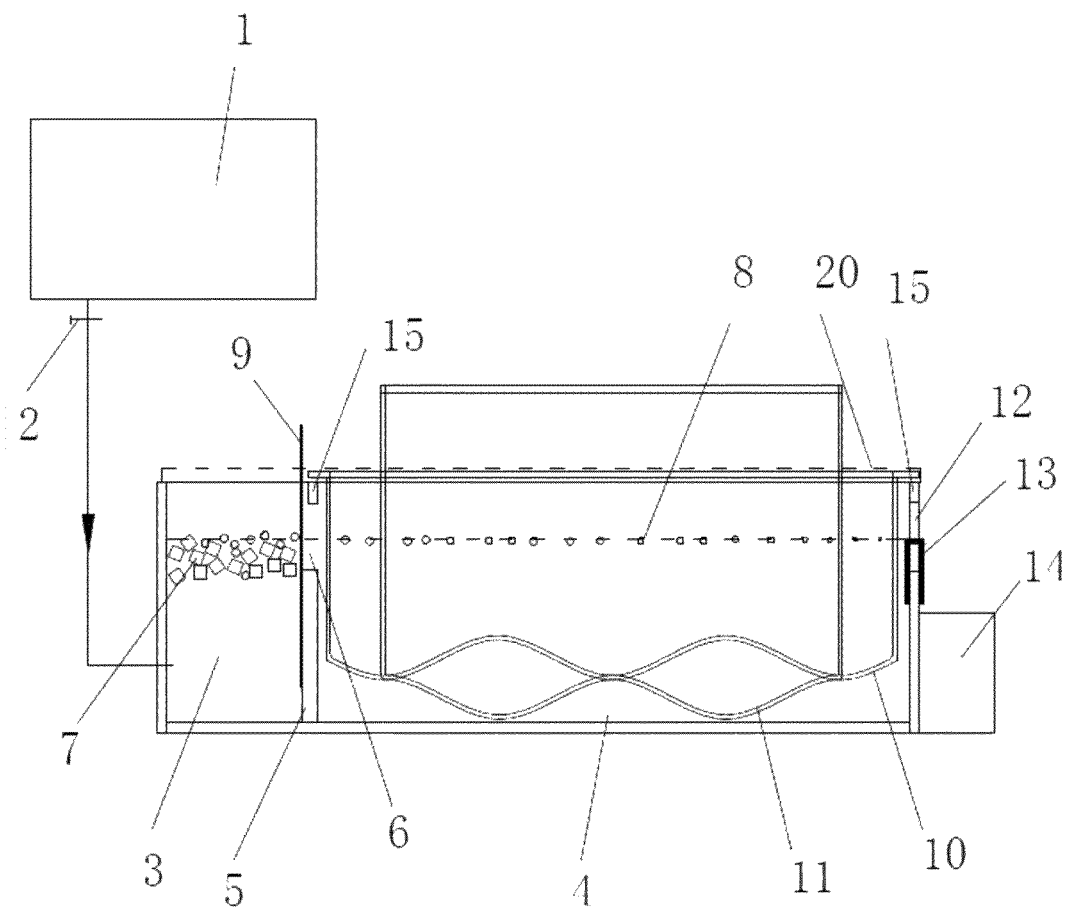
FIG. 1 is a schematic structural view according to the present disclosure.

Embodiment 1: A fruit sterilizing and cooling device using a plasma-activated ice-water mixture is as shown in FIG. 1. The embodiment takes sterilization and cooling of cherries as an example. Because of soft and juicy pulp, the cherries are rotten very easily at a room temperature, with the weight loss, browning, stem drying, pulp softening, and surface indentation. Meanwhile, the cherries become ripe as summer comes. Due to the high air temperature and the concentrated harvesting time, operators on the industry chain of the cherries suffer a huge economic loss. Through a test, cores of the picked cherries have a temperature of about 24° C., with the obvious respiratory action. Due to heat produced by the respiratory action, the cores keep the relatively high temperature for a long time if the cherries are directly sent to a cold store for storage, thereby affecting the quality of the cherries, and reducing the fresh-keeping effect of the low-temperature storage.

Figure 2:
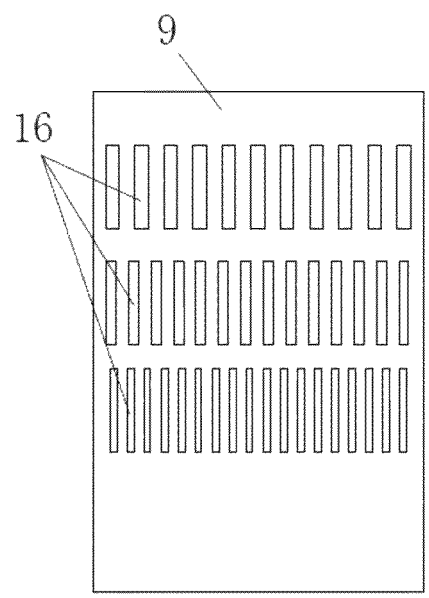
FIG. 2 is a schematic structural view of a grid plate according to the present disclosure.

The device includes a top-opened tank body. The tank body includes a front side provided with ice-water tank 3, and a rear side provided with cooling tank 4. Clapboard 5 is provided between the ice-water tank 3 and the cooling tank 4. Water passing port 6 is formed in an upper portion of the clapboard. Grid plate 9 is inserted at the water passing port. Initial ice cubes 7 are added to an upper portion of the ice-water tank 3. As shown in FIG. 2, the grid plate 9 is provided with multiple groups of grids 16 from top to bottom. The multiple groups of grids 16 are gradually narrow. A height of the grid is greater than a height of the water passing port. A width of the grid is not greater than a particle size of the initial ice cube. One side of a lower portion of the ice-water tank is connected to a PAW generator 1. Valve 2 is provided at a water outlet of the PAW generator 1. In the embodiment, the PAW generator uses a CTE-2000KW low-temperature plasma experimental power supply from the Nanjing Suman Plasma Technology Co., Ltd. and a water treatment reactor. The generated PAW has an initial temperature of about 50° C.

Figure 3:
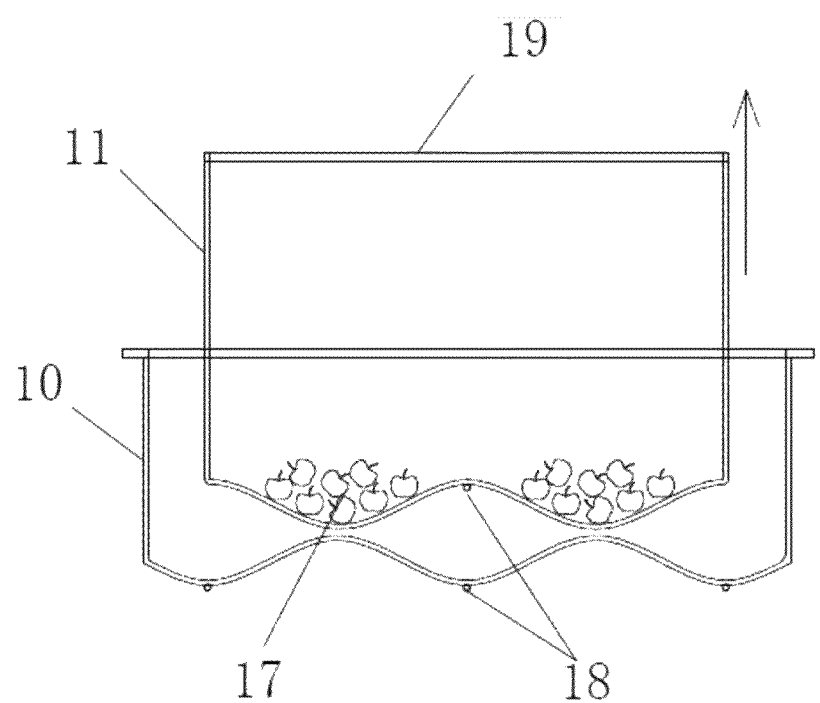
FIG. 3 is a schematic view illustrating that a movable fence frame is lifted up according to the present disclosure.
Figure 4:
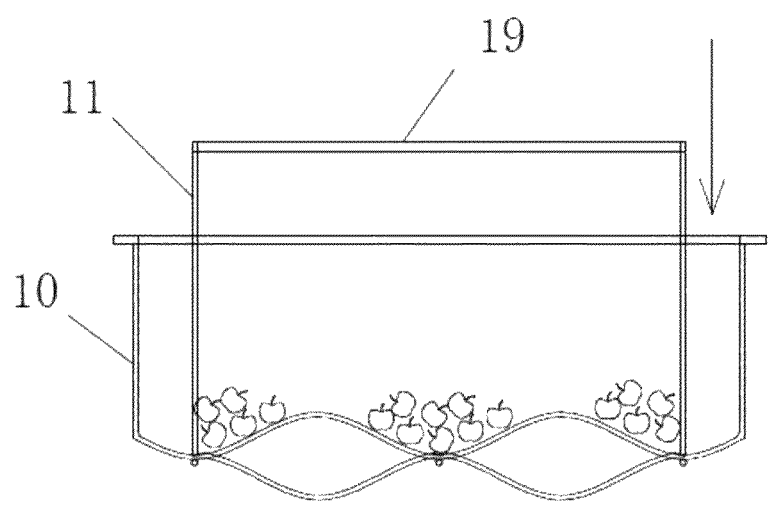
FIG. 4 is a schematic view illustrating that a movable fence frame is lifted down according to the present disclosure.
Figure 5:
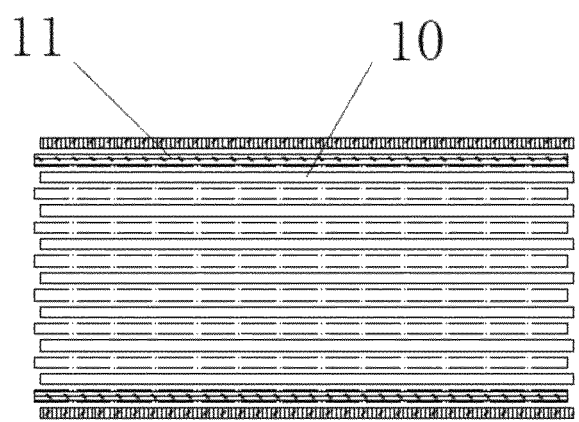
FIG. 5 is a schematic structural view illustrating that a grid bar of the movable fence frame and a grid bar of the fixed fence frame are provided alternately in a staggered manner according to the present disclosure.

Fixed fence frame 10 and movable fence frame 11 are provided in the cooling tank 4. Cherries 17 to be treated are placed in the movable fence frame. Both the fixed fence frame and the movable fence frame are a grid frame. As shown in FIG. 5, a grid bar at a bottom of the fixed fence frame 10 and a grid bar at a bottom of the movable fence frame 11 are provided alternately in a staggered manner. As shown in FIG. 3 and FIG. 4, the bottom of the fixed fence frame 10 and the bottom of the movable fence frame 11 are wave-shaped. A peak at the bottom of the fixed fence frame and a valley at the bottom of the movable fence frame are aligned up and down. A valley at the bottom of the fixed fence frame and a peak at the bottom of the movable fence frame are aligned up and down. The fixed fence frame 10 and the movable fence frame 11 each may be provided with transverse reinforcing bar 18. The reinforcing bar is provided under the valley of the fixed fence frame 10. The reinforcing bar is provided under the peak of the movable fence frame 11. Preferably, the bottom of the fixed fence frame 10 and the bottom of the movable fence frame 11 are identically wave-shaped. When the valley of the movable fence frame comes in contact with a bottom of the cooling tank 4, the peak of the movable fence frame is flush with the valley of the fixed fence frame.

Lugs are respectively provided at a front end and a rear end of the fixed fence frame 10. Cross-bars 15 for supporting the lugs are respectively provided above the water passing port and an overflow port. The fixed fence frame is unmovable after mounted. The movable fence frame is provided with lifting handles 19 higher than the tank body. In the embodiment, the lifting handles are respectively provided at a left side and a right side of the movable fence frame. Cover plate 20 is provided on the tank body. An avoidance groove for allowing the lifting handle 19 of the movable fence frame to pass through is formed in the cover plate 20.

A rear side of the cooling tank 4 is provided with the overflow port 12. The overflow port is provided with adjustment weir plate 13. The adjustment weir plate is clasped at a lower edge of the overflow port in a height adjustable manner. A rear side of the overflow port is provided with overflow tank 14. According to a stacked height of the cherries, adjusting a height of the adjustment weir plate 13 can control a water level. Water in the overflow tank 14 has a temperature close to 0° C. The water can be filtered roughly to enter an ice maker for ice making, thereby reducing the energy consumption.

The ice cube can be added to the ice-water tank continuously to keep the water temperature in the tank body. In order to keep the sterilization effect of the plasma-activated ice-water mixture, the PAW may be added periodically. The PAW is cooled with the ice-water tank. The movable fence frame is lifted up and down periodically, such that the cherries are turned over between the peak and the valley of the movable fence frame, and between the peak and the valley of the fixed fence frame. Through a test, the picked cherries have a temperature of 24.1° C. After the cherries are precooled by the plasma-activated ice-water mixture for 30 min, the temperature can be reduced to 5.8° C. After the cherries are precooled by the plasma-activated ice-water mixture for 3-4 h, the temperature can be reduced to 3.8° C. The picked cherries have an ethylene release rate of 139.73 µL kg$^{-1}$ h$^{-1}$. After the cherries are precooled by the plasma-activated ice-water mixture for 30 min, the ethylene release rate can be reduced to 28.82 µL kg$^{-1}$ h$^{-1}$. After the cherries are precooled by the plasma-activated ice-water mixture for 3-4 h, the ethylene release rate can be reduced to 7.03 µL kg$^{-1}$ h$^{-1}$. In terms of the sterilization effect, after precooled by the plasma-activated ice-water mixture for 3-4 h, the cherries are stored in the cold store for 3-5 days, with a fungal count below the detection line.

Figure 6:
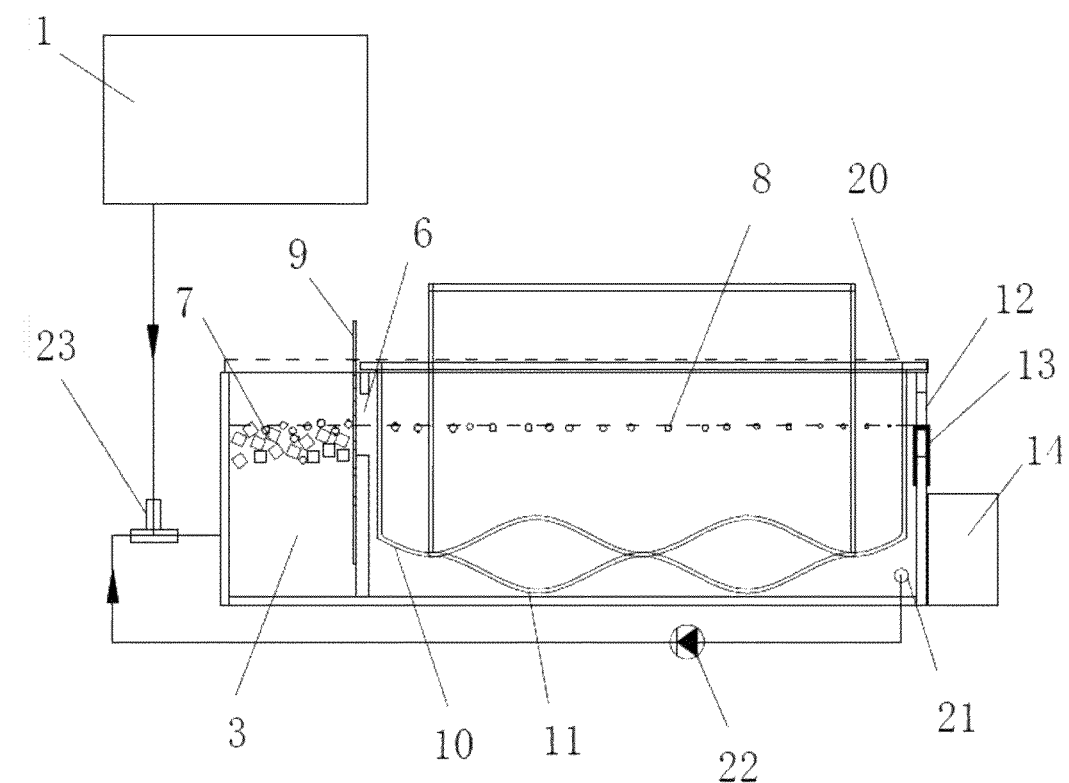
FIG. 6 is a second schematic structural view according to the present disclosure.
Figure 7:
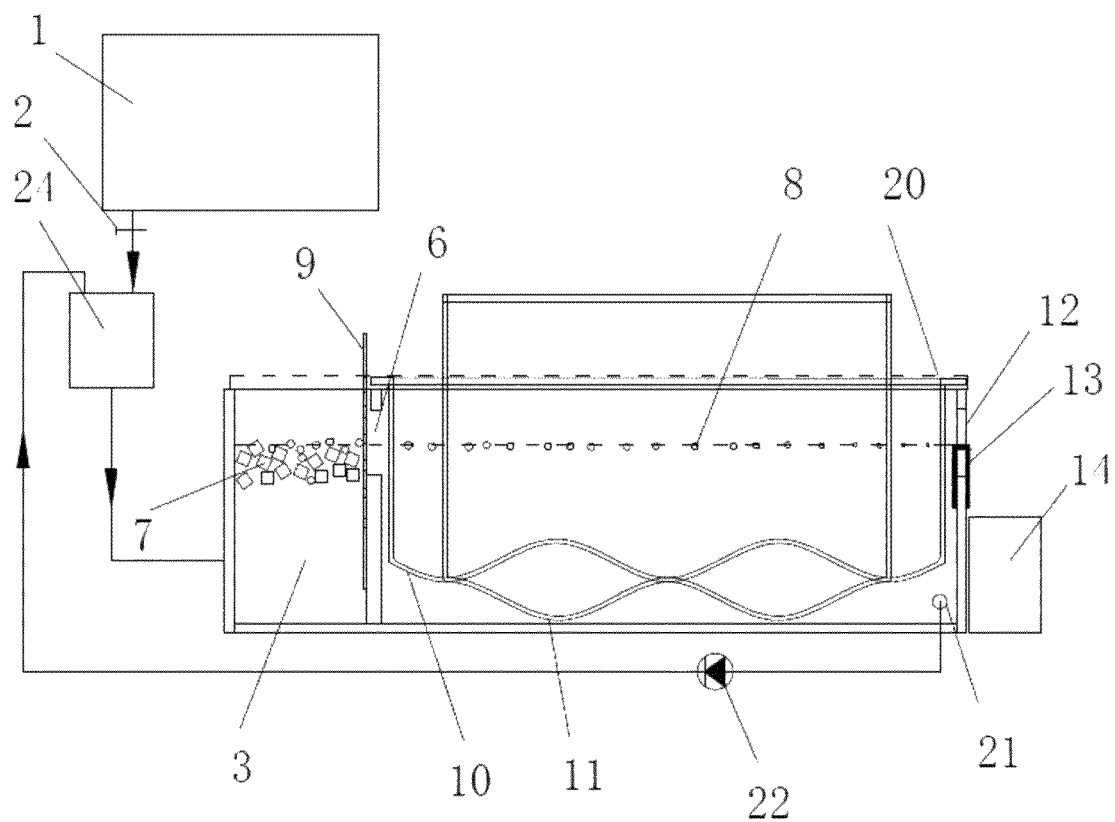
FIG. 7 is a third schematic structural view according to the present disclosure.

Embodiment 2: A fruit sterilizing and cooling device using a plasma-activated ice-water mixture is as shown in FIG. 6. In the device, water outlet 21 is formed in a sidewall of a rear end of the cooling tank 4. The water outlet is connected to the ice-water tank 3 through circulating pump 22. Three-way valve 23 is provided between the circulating pump and the ice-water tank. The three-way valve includes two inlets and one outlet. A second inlet of the three-way valve is connected to the water outlet of the PAW generator 1. Other structures are the same as those in Embodiment 1.

The circulating pump can make the water in the tank body flow, thereby driving more half-melted ice cubes to enter from the ice-water tank to the cooling tank. When the high-temperature PAW is added, the circulating water can be quickly mixed with the newly added PAW. Meanwhile, a proportion of the circulating water to the newly added PAW is controlled at 3:1 to 5:1, to cool the PAW to about 10° C. or lower. The ice cubes in the ice-water tank ensure the uniform low-temperature water in the tank body, and prevent the high-temperature PAW not cooled uniformly from directly flowing to the cooling tank.

Embodiment 3: A fruit sterilizing and cooling device using a plasma-activated ice-water mixture is as shown in FIG. 6. In the device, water outlet 21 is formed in a sidewall of a rear end of the cooling tank 4. The water outlet is connected to circulating water tank 24 through circulating pump 22. A water outlet of the circulating water tank is connected to the ice-water tank 3. The water outlet of the PAW generator is connected to the circulating water tank. A water level of the circulating water tank is higher than the ice-water tank. Other structures are the same as those in Embodiment 1.

In the embodiment, the circulating pump can make the water in the tank body flow, thereby driving more half-melted ice cubes to enter from the ice-water tank to the cooling tank. Meanwhile, when the high-temperature PAW is added, the low-temperature circulating water in the circulating water tank 24 is mixed with the newly added PAW to cool the PAW to about 10° C. or lower. The ice cubes in the ice-water tank ensure the uniform low-temperature water in the tank body, and prevent the high-temperature PAW not cooled uniformly from directly flowing to the cooling tank.

What is claimed is:

1. A fruit sterilizing and cooling device using a plasma-activated ice-water mixture, comprising
    a top-opened tank body, wherein the top-opened tank body comprises a front side provided with an ice-water tank, and a rear side provided with a cooling tank;
    a clapboard provided between the ice-water tank and the cooling tank;
    a water passing port formed in an upper portion of the clapboard;
    a grid plate inserted at the water passing port;
    ice cubes added to an upper portion of the ice-water tank;
    a plasma-activated water (PAW) generator connected to one side of a lower portion of the ice-water tank;
    a valve provided at a water outlet of the PAW generator; and
    a fixed fence frame and a movable fence frame, wherein the fixed fence frame and the movable fence frame are provided in the cooling tank;
    wherein fruits to be treated are placed in the movable fence frame; both the fixed fence frame and the movable fence frame are a grid frame; a grid bar at a bottom of the fixed fence frame and a grid bar at a bottom of the movable fence frame are provided alternately in a staggered manner; the bottom of the fixed fence frame and the bottom of the movable fence frame are wave-shaped; a peak at the bottom of the fixed fence frame and a valley at the bottom of the movable fence frame are aligned up and down; and a valley at the bottom of the fixed fence frame and a peak at the bottom of the movable fence frame are aligned up and down;
    wherein the movable fence frame is provided with lifting handles higher than the top-opened tank body; a rear side of the cooling tank is provided with an overflow port; and a rear side of the overflow port is provided with an overflow tank.

2. The fruit sterilizing and cooling device using the plasma-activated ice-water mixture according to claim 1, wherein the bottom of the fixed fence frame and the bottom of the movable fence frame are identically wave-shaped; and when the valley of the movable fence frame comes in contact with a bottom of the cooling tank, the peak of the movable fence frame is flush with the valley of the fixed fence frame.

3. The fruit sterilizing and cooling device using the plasma-activated ice-water mixture according to claim 2, wherein a cover plate is provided on the tank body; and an avoidance groove for allowing each of the lifting handles of the movable fence frame to pass through is formed in the cover plate.

4. The fruit sterilizing and cooling device using the plasma-activated ice-water mixture according to claim 2, wherein the grid plate is provided with a plurality of groups of grids from a top to a bottom; and each grid in a group of the plurality of groups of grids at the bottom is narrower than each grid in a group of the plurality of groups of grids at the top.

5. The fruit sterilizing and cooling device using the plasma-activated ice-water mixture according to claim 2, wherein a water outlet is formed in a sidewall of a rear end of the cooling tank; the water outlet is connected to the ice-water tank through a circulating pump; a three-way valve is provided between the circulating pump and the ice-water tank; the three-way valve comprises two inlets and one outlet; and a second inlet of the three-way valve is connected to the water outlet of the PAW generator.

6. The fruit sterilizing and cooling device using the plasma-activated ice-water mixture according to claim 2, wherein a water outlet is formed in a sidewall of a rear end of the cooling tank; the water outlet is connected to a circulating water tank through a circulating pump; a water outlet of the circulating water tank is connected to the ice-water tank; the water outlet of the PAW generator is connected to the circulating water tank; and a water level of the circulating water tank is higher than the ice-water tank.

7. The fruit sterilizing and cooling device using the plasma-activated ice-water mixture according to claim 1, wherein lugs are respectively provided at a front end and a rear end of the fixed fence frame; and cross-bars for supporting the lugs are respectively provided above the water passing port and the overflow port.

8. The fruit sterilizing and cooling device using the plasma-activated ice-water mixture according to claim 7, wherein a cover plate is provided on the tank body; and an avoidance groove for allowing each of the lifting handles of the movable fence frame to pass through is formed in the cover plate.

9. The fruit sterilizing and cooling device using the plasma-activated ice-water mixture according to claim 7, wherein the grid plate is provided with a plurality of groups of grids from a top to a bottom; and each grid in a group of the plurality of groups of grids at the bottom is narrower than each grid in a group of the plurality of groups of grids at the top.

10. The fruit sterilizing and cooling device using the plasma-activated ice-water mixture according to claim 7, wherein a water outlet is formed in a sidewall of a rear end of the cooling tank; the water outlet is connected to the ice-water tank through a circulating pump; a three-way valve is provided between the circulating pump and the ice-water tank; the three-way valve comprises two inlets and one outlet; and a second inlet of the three-way valve is connected to the water outlet of the PAW generator.

11. The fruit sterilizing and cooling device using the plasma-activated ice-water mixture according to claim 1, wherein the lifting handles are respectively provided at a front end and a rear end of the movable fence frame, or at a left side and a right side of the movable fence frame.

12. The fruit sterilizing and cooling device using the plasma-activated ice-water mixture according to claim 11, wherein a cover plate is provided on the tank body; and an avoidance groove for allowing each of the lifting handles of the movable fence frame to pass through is formed in the cover plate.

13. The fruit sterilizing and cooling device using the plasma-activated ice-water mixture according to claim 11, wherein the grid plate is provided with a plurality of groups of grids from a top to a bottom; and each grid in a group of the plurality of groups of grids at the bottom is narrower than each grid in a group of the plurality of groups of grids at the top.

14. The fruit sterilizing and cooling device using the plasma-activated ice-water mixture according to claim 11, wherein a water outlet is formed in a sidewall of a rear end of the cooling tank; the water outlet is connected to the ice-water tank through a circulating pump; a three-way valve is provided between the circulating pump and the ice-water tank; the three-way valve comprises two inlets and one outlet; and a second inlet of the three-way valve is connected to the water outlet of the PAW generator.

15. The fruit sterilizing and cooling device using the plasma-activated ice-water mixture according to claim 1, wherein a cover plate is provided on the top-opened tank body; and an avoidance groove for allowing each of the lifting handles of the movable fence frame to pass through is formed in the cover plate.

16. The fruit sterilizing and cooling device using the plasma-activated ice-water mixture according to claim 1, wherein the grid plate is provided with a plurality of groups of grids from a top to a bottom; and each grid in a group of the plurality of groups of grids at the bottom is narrower than each grid in a group of the plurality of groups of grids at the top.

17. The fruit sterilizing and cooling device using the plasma-activated ice-water mixture according to claim 16, wherein a width of each grid of the plurality of groups of grids is less than or equal to an initial size of a particle of each of the ice cubes.

18. The fruit sterilizing and cooling device using the plasma-activated ice-water mixture according to claim 16, wherein the overflow port is provided with an adjustment weir plate; and the adjustment weir plate is clasped at a lower edge of the overflow port in a height adjustable manner.

19. The fruit sterilizing and cooling device using the plasma-activated ice-water mixture according to claim 1, wherein a water outlet is formed in a sidewall of a rear end of the cooling tank; the water outlet is connected to the ice-water tank through a circulating pump; a three-way valve is provided between the circulating pump and the ice-water tank; the three-way valve comprises two inlets and one outlet; and a second inlet of the three-way valve is connected to the water outlet of the PAW generator.

20. The fruit sterilizing and cooling device using the plasma-activated ice-water mixture according to claim 1, wherein a water outlet is formed in a sidewall of a rear end of the cooling tank; the water outlet is connected to a circulating water tank through a circulating pump; a water outlet of the circulating water tank is connected to the ice-water tank; the water outlet of the PAW generator is connected to the circulating water tank; and a water level of the circulating water tank is higher than the ice-water tank.

* * * * *